United States Patent Office 3,342,694
Patented Sept. 19, 1967

3,342,694
PROCESS FOR THE PREPARATION OF STEROIDS
Elisabeth Becher, Basel, Hans Els, Binningen, Andor
Fürst and Gisela Gross, Basel, and Pierre Reusser,
Riehen, Switzerland, assignors to Hoffmann-La Roche
Inc., Nutley, N.J., a corporation of New Jersey
No Drawing. Filed May 19, 1964, Ser. No. 368,693
Claims priority, application Switzerland, May 22, 1963,
6,407/63
3 Claims. (Cl. 195—51)

ABSTRACT OF THE DISCLOSURE

Retrosteroids of the androstane series which have a hydroxy or oxo group in the 17-position are prepared by enzymatic oxidation by means of the fungus *Fusarium solani* of 20-keto-retrosteroids.

Detailed description of the invention

The present invention relates to processes for the preparation of oxygenated retrosteroids. More particularly, it relates to processes for the preparation of retrosteroids of the androstane series which have a hydroxy or oxo group in the 17-position.

The process in accordance with the invention is characterized in that a 20-keto-steroid of the retropregnane series is subjected to aerobic enzymatic oxidation by means of the fungus *Fusarium solani*.

Steroids in which the methyl group at the C-atom 10 has the α-configuration and the hydrogen atom at the C-atom 9 (or a 9-substituent) has the β-configuration are denoted in the instant specification as retrosteroids. Steroids of the pregnane series having a retro configuration are accordingly denoted as retropregnanes or as 9β,10α-pregnanes. The retrosteroids prepared by the instant process are known to the art. See, e.g., Belgian patent specification 577,615.

The process of the invention is carried out by employing the enzymes of *Fusarium solani* (e.g., the fungus strain registered under the ATCC No. 12823) on 20-keto-steroids of the retropregnane series to bring about the degradation of the 17-side chain to a 17-hydroxy or a 17-oxo group. With longer enzyme action a δ-lactone ring can form from the D-ring of the starting steroid. Thus, for example, a $\Delta^{4,6}$-9β,10α - androstadien - 17β-ol-3-one (II), $\Delta^{4,6}$-9β,10α-androstadien-3,17-dione (III) and $\Delta^6$-9β,10α-testolactone (IV) can be obtained from $\Delta^{4,6}$-9β,10α-pregnadien-3,20-dione (I) ($\Delta^6$-retroprogesterone) in accordance with the following reaction scheme by incubation with *Fusarium solani*.

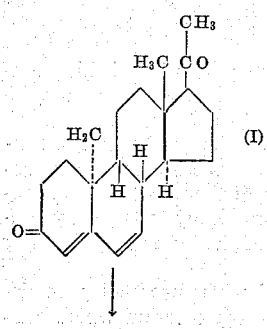

(I)

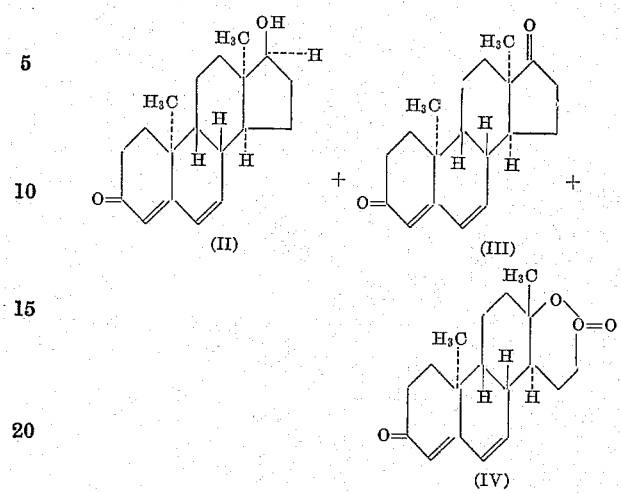

Surprisingly, the enzymatic oxidation of steroids of the retropregnane series which are hydrogenated in the 1,2-position brings about no appreciable dehydrogenation in the 1,2-position on prolonged incubation, as is the case in the normal pregnane series.

The 20-keto-steroids of the retropregnane series used as starting materials can be saturated or can contain one or more double bonds; for example, in one or more of positions 1, 4, 5, 6, 7, 8, 9(11), and 15, and preferably in at least the 4-position, e.g., in the 4-position only, or in the 4-position and one or more additional positions [such as, for example, additionally in the 1-, 6-, 1,6-, 1,6,9(11), or in the 6,9(11)-position]. The starting materials can contain, in addition to a 20-oxo group, one or more additional substituents in the ring system and/or in the 17-side chain. Examples of such substituents are: free or protected oxo groups, free or protected hydroxy groups, halogen atoms (such as fluorine or chlorine atoms), and lower alkyl groups. A protected oxo group is preferably a ketalized oxo group such as, for example, the ethylenedioxy group. A protected hydroxy group is, for example, an esterified hydroxy group (esterified, for example, with a lower aliphatic, monocyclic, aromatic or a 5- or 6- membered heterocyclic carboxylic acid such as acetic acid, propionic acid, benzoic acid, furan carboxylic acid) or an etherified hydroxy group such as the tetrahydro-pyranyloxy, benzyloxy or triphenyl-methoxy group. Preferred starting materials are those 20-keto-steroids of the retropregnane series which have an oxo or hydroxy group in the 3-position and a double bond in at least the 4-position—such as $\Delta^4$-9β,10α-pregnen-3,20-dione [retroprogesterone], and $\Delta^{4,6}$-9β,10α - pregnadien - 3,20-dione [$\Delta^6$-retroprogesterone].

As the nutrient media for the culture of *Fusarium solani* there can be used nutrient solutions which are known to the art for the production of this microorganism; for example, nutrient solutions with a content of a nitrogen and carbon source as well as of inorganic salts. As the nitrogen source there may be named by way of example: peptones, corn-steep liquor, soya products, yeast extracts, amino acids, protein hydrolyzates, nitrates and ammonium salts. Assimilable carbohydrates (such as glucose, saccharose) as well as amino acids are of importance as the carbon source. Synthetic nutrient solutions can also be used.

The culture of the microorganism *Fusarium solani* employed for the degradation of the side-chain in accordance with the invention is effected under aerobic conditions, conveniently in a submersion process; for example, in a shaking culture or in fermenters while stirring and ventilating. The preferred process is as follows: after sterilization, the nutrient solution is inoculated, for example, with a previously manufactured shaking flask culture or a mycelia-spore suspension of *Fusarium solani,* and thereafter shaken or stirred for from about 6 to about 72 hours, preferably from about 24 to about 48 hours at about 15 to about 40° C., preferably about 24 to about 30° C., under ventilation. After this pre-growth, the addition of the retrosteroid which is to be oxidized, in the form of a solution, e.g., in acetone, methanol or ethanol, is effected under sterile conditions. The duration of incubation can be from about 1 to about 8 days or even longer; e.g., up to about 25 days. The course of the fermentation can be controlled by removal of samples and performing thin-layer chromatographical analysis thereon. The isolation of the products of the process can be effected in accordance with known methods, such as chromatography, counter-current distribution, fractional crystallization, etc.

The products of the process are known to the art. Also, the products of the process are themselves physiologically active, possessing anabolic and anti-androgenic activity, and are useful as anabolic or anti-androgenic agents. They are also useful as intermediates for the preparation of other physiologically active retrosteroids according to processes given in Belgian patent specification 577,615.

*Example 1*

4 liters of a nutrient solution containing 20 g. of saccharose, 3 g. of yeast extract, 1 g. of glycine, 1 g. of sodium nitrate, 1 g. of primary potassium phosphate, 0.5 g. of magnesium sulfate, 0.5 g. of potassium chloride, and 10 mg. of iron sulfate per 1000 ml. of distilled water are sterilized in a shaking vessel for 45 minutes at 120° C. The solution, the pH value of which is 5.0, is thereafter inoculated with a mycelial-spore suspension which has been obtained from a beer-wort agar-slant culture of *Fusarium solani.* The fermentation mixture is mechanically shaken at 24–28° C. under ventilation. After 48 hours, 2 g. of $\Delta^{4,6}$-9$\beta$,10$\alpha$-pregnadien-3,20-dione ($\Delta^6$-retroprogesterone) in 40 ml. of acetone are added. Then the culture is further grown for a length of 8 days under unchanged conditions.

Two cultures obtained in the previously described manner are combined and the fermentation broth (total 8 liters) is separated off from the mycelia. The fermentation broth is first extracted with 8 liters of ethyl acetate and then an additional three times, each time with 4 liters of ethyl acetate. The separated mycelia is stirred with 3 liters of ethyl acetate. The combined extracts are washed with an aqueous 10 percent sodium chloride solution, then dried over sodium sulfate, and finally evaporated under reduced pressure.

The oily evaporation residue (total 4.6 g.) is dissolved in 100 ml. of acetic ester/benzene (1:1) and treated with 5 g. of activated carbon. After filtration through a filter of diatomaceous earth there is obtained a light yellow clear solution which, in the main, consisted of $\Delta^{4,6}$-9$\beta$,10$\alpha$-androstadien-3,17-dione and $\Delta^{4,6}$-9$\beta$,10$\alpha$-androstadien-17$\beta$-ol-3-one on the basis of the plate chromatogram (systems benzene/acetone; 7:3 and 4:1 on silica gel).

The light yellow filtrate is now evaporated to dryness under reduced pressure and chromatographed on 300 ml. of silica gel (Merck 0.05–0.2 mm.) in benzene/acetone 9:1. 100 fractions of 10 ml. are collected. Every second fraction is analyzed plate-chromatographically. Identical fractions are combined and evaporated to dryness under reduced pressure. Fractions 1–15 contain impurities in small amounts. Fractions 16–25 contain 1.75 g. of almost pure $\Delta^{4,6}$-9$\beta$,10$\alpha$-androstadien-3,17-dione. After two crystallizations from methylene chloride/methanol/isopropyl ether, this substance is obtained analytically pure with a melting point of 193–196° C.; $\lambda$ max. (U.V.)=285 m$\mu$; $\epsilon$=25700.

Fractions 30–34 contain 0.21 g. of $\Delta^{4,6}$-9$\beta$,10$\alpha$-androstadien-17$\beta$-ol-3-one of melting point 169–171° (after two crystallizations from methylene chloride/acetone/isopropyl ether). $\lambda$ max. (U.V.)=285 m$\mu$; $\epsilon$=27500.

0.27 g. of a mixture of the previously named 17-hydroxy and 17-keto compounds are obtained from fractions 26–29 in the form of a light yellow oil. The light yellow oil is dissolved in 200 ml. of benzene and treated with an equivalent of chromic acid in 5 percent acetic acid. The mixture is shaken for 10 hours. Then the organic phase is separated and washed with water, then with saturated bicarbonate solution and again with water, finally dried over sodium sulfate and concentrated to dryness under reduced pressure. There is thus obtained a further 0.19 g. of $\Delta^{4,6}$-9$\beta$,10$\alpha$-androstadien-3,17-dione.

*Example 2*

Four fermenters provided with an agitator are each charged with 6 liters of the nutrient medium described in Example 1 with the addition of a foam-control agent (silicone oil). After sterilization, the nutrient medium is inoculated with a 3-day old shaking flask culture of *Fusarium solani* and the culture is left to grow at 28° C. for 48 hours while stirring and ventilating. By this time there is already formed a copious amount of mycelia. 1.5 g. of $\Delta^{4,6}$-19$\beta$,10$\alpha$-pregnadien-3,20-dione ($\Delta^6$-retroprogesterone) in 40 ml. of acetone are now added to each fermenter. After concluding the reaction, the fermentation is discontinued (in the present experiment incubation times of 2–6 days are required for the reaction of the individual charges.) After separation of the mycelia, the fermentation liquors are extracted and worked up according to the process described in Example 1 (the individual crude extracts showed no variation in the plate-chromatographical examination in relation to composition, and were accordingly combined). 10.05 g. of a yellow oil is obtained which is chromatographed on 600 ml. of silica gel. Benzene/acetone 4:1 serves as the elution agent. Fractions of 25 ml. are collected. Fractions 1–26 contain impurities. 495 mg. of pure $\Delta^{4,6}$-9$\beta$,10$\alpha$-androstadien-3,17-dione of melting point 192–195° C. are obtained from fractions 28–53 by repeated crystallization from methylene chloride/methanol/isopropyl ether. 230 mg. of pure $\Delta^{4,6}$-9$\beta$,10$\alpha$-androstadien-17$\beta$-ol-3-one of melting point 168–170° C. can be isolated from fractions 90–105 by fractional crystallization from methylene chloride/methanol and methylene chloride/methanol/isopropyl ether. $\Delta^6$-9$\beta$,10$\alpha$-testolactone can be isolated from the mother liquors of these fractions by further crystallization. Melting point 192–194° C.; $\lambda_{max.}$ (U.V.)=286 m$\mu$; $\epsilon$=25000.

*Example 3*

10 Erlenmeyer flasks of 500 ml. are each charged with 100 ml. of a nutrient solution of the composition given in Example 1, closed with wads of cotton wool and sterilized at 120° C. for 20 minutes. Then it is inoculated with a spore-mycelial suspension obtained from an agar-slant culture of *Fusarium solani* on beer-wort agar. The flasks, which are provided with baffles for the purpose of improving aeration, are shaken on a rotating shaking machine at 24–28° C. After a growth time of 66 hours, 20 mg. of $\Delta^4$-9$\beta$,10$\alpha$-pregnen-3,20-dione (retroprogesterone) in 1 ml. of acetone are added per flask under aseptic conditions. After 24, 48, and 96 hours, the thin-layer chromatographic control of the fermentation shows that the retroprogesterone introduced is practically completely degraded to $\Delta^4$-9$\beta$,10$\alpha$-androsten-3,17-dione already after 24 hours.

The same result is obtained when proceeding as described above, but using a nutrient solution which contains 15 g. of peptone, 3 g. of dried residue from corn-steep liquor and 50 mg. of glucose in 1000 ml. of tap water and adjusting it to a pH of 6.5 with sodium hydroxide.

Example 4

6 liters of a nutrient solution (15 g. of peptone, 3 g. of dried residue from corn-steep liquor, 50 mg. of glucose per 1000 ml. of water, adjusted to pH=6.5 with sodium hydroxide) are inoculated in a fermenter, which is provided with a stirrer and is ventilated, under sterile conditions with a 3-day old shaking flask culture of *Fusarium solani*, with the addition of a foam-control agent. After 46 hours growth at 28° C., 1.2 g. of $\Delta^4$-9$\beta$,10$\alpha$-pregnen-3,20-dione (retroprogesterone) dissolved in 40 ml. of acetone are added. After 48 hours (end pH=4.6) the fermentation liquor is filtered and the filtrate extracted as described in Example 1. The crude extract is dissolved in 60 ml. of acetone and treated while warm with 1.2 g. of activated carbon. After filtration and evaporation there are obtained 2.28 g. of a yellow oil. This is dissolved in a small amount of benzene and chromatographed on 400 ml. of silica gel. Fractions up to 10 ml. are collected. Fractions 1–116 contain, altogether, 780 mg. of impurities. Fractions 117–170 (benzene/2 percent acetone) contain 490 mg. of plate-chromatographically uniform $\Delta^4$-9$\beta$,10$\alpha$-androsten-3,17-dione. Melting point 155–156° C. (after repeated recrystallization from methylene chloride/isopropyl ether); $\lambda_{max}$ (U.V.)=251 m$\mu$; $\epsilon$=16500. 540 mg. of uniform $\Delta^4$-9$\beta$,10$\alpha$-androsten-17$\beta$-ol-3-one are obtained from fractions 186–244 (benzene/acetone 9:1). Melting point 154–155° C. (from methylene chloride/isopropyl ether); $\lambda$ max. (U.V.)=241 m$\mu$; $\epsilon$=16000.

Example 5

1.2 g. of $\Delta^4$-9$\beta$,10$\alpha$-pregnen-3,20-dione (retroprogesterone) are subjected to the enzymatic oxidation as described in Example 4 but with extension of the incubation time to 7 days (after the addition of the steriod). Thereby there are obtained 1.12 g. of uniform $\Delta^4$-9$\beta$,10$\alpha$-androsten-3,17-dione (in this experiment no $\Delta^4$-9$\beta$,10$\alpha$-androsten-17$\beta$-ol-3-one can be isolated from the fermentation liquor).

We claim:
1. A process for the preparation of oxygenated retrosteroids comprising contacting a 20-ketone-steroid of the retropregnane series saturated in the 1,2-position, having a keto group in each of positions 3 and 20 and a double bond in the 4,5-position, with the microorganism *Fusarium solani* under aerobic conditions and isolating the oxygenated retrosteroid.
2. A process according to claim 1 wherein $\Delta^4$-9$\beta$,10$\alpha$-pregnen-3,20-dione is employed as the starting material.
3. A process according to claim 1 wherein $\Delta^{4,6}$-9$\beta$,10$\alpha$-pregnadien-3,20-dione is employed as the starting material.

References Cited

UNITED STATES PATENTS 2,904,472  9/1959  Wettstein _____ 195—51

OTHER REFERENCES

Derwent Belgain Patents Report, vol. 56, B–60A, September–December 1959, Section Three, pp. C18 and C19.

ALVIN E. TANEHOLTZ, *Primary Examiner.*

UNITED STATES PATENT OFFICE
CERTIFICATE OF CORRECTION

Patent No. 3,342,694                      September 19, 1967

Elisabeth Becher et al.

It is hereby certified that error appears in the above numbered patent requiring correction and that the said Letters Patent should read as corrected below.

Column 2, lines 1 to 12, formulas (II) and (III) should appear as shown below instead of as in the patent:

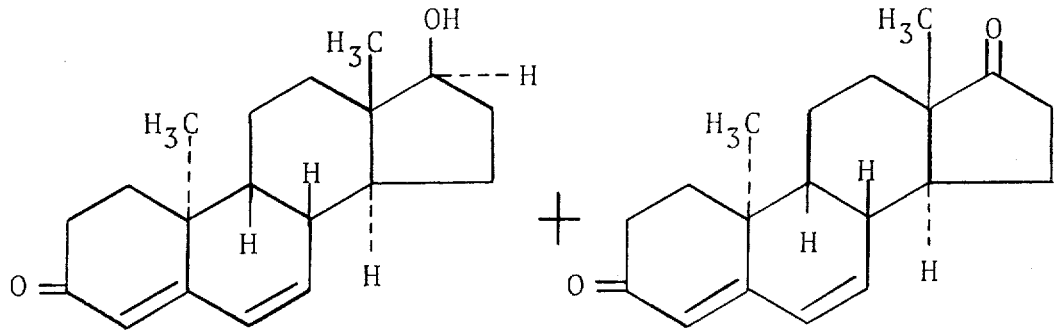

column 4, line 68, for "aspetic" read -- aseptic --; column 5, line 29, for "251" read -- 241 --; column 6, line 29, for "56" read -- 58 --.

Signed and sealed this 24th day of December 1968.

(SEAL)
Attest:

EDWARD M. FLETCHER, JR.                EDWARD J. BRENNER
Attesting Officer                        Commissioner of Patents